A. S. EPPERSON.
CONVERTIBLE DUST PAN.
APPLICATION FILED AUG. 10, 1909.
936,990.
Patented Oct. 12, 1909.
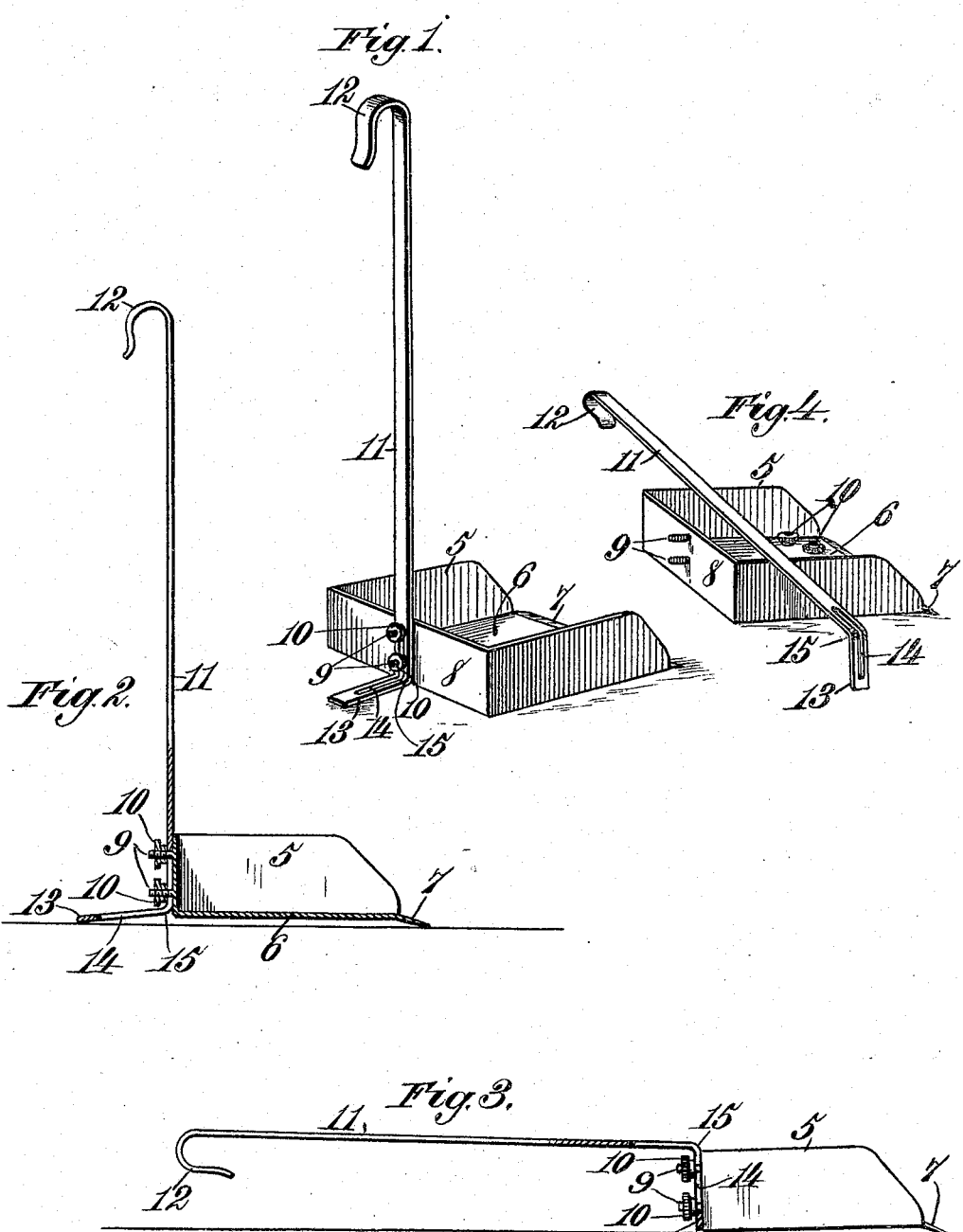
Witnesses.
Robert Everett
J. B. Keefer
Inventor.
Albert S. Epperson.
By James L. Norris,
Atty.

UNITED STATES PATENT OFFICE.

ALBERT S. EPPERSON, OF CAMERON, TEXAS.

CONVERTIBLE DUST-PAN.

936,990.

Specification of Letters Patent.

Patented Oct. 12, 1909.

Application filed August 10, 1909. Serial No. 512,156.

*To all whom it may concern:*

Be it known that I, ALBERT S. EPPERSON, a citizen of the United States, residing at Cameron, in the county of Milam and State of Texas, have invented new and useful Improvements in Convertible Dust-Pans, of which the following is a specification.

This invention relates to a convertible dust pan, and the primary object of the same is to provide a device of this character with a handle readily adjustable to adapt it to be used without requiring a stooping posture on the part of the user.

A further object of the invention is to provide a device that may be readily changed from a dust pan to a shovel by a simple manipulation of the handle and without completely detaching the latter.

With these and other objects and advantages in view, the invention consists in the construction and arrangement of parts which will be more fully hereinafter specified.

In the drawing: Figure 1 is a perspective view of the device arranged as a dust pan. Fig. 2 is a longitudinal section through the dust pan as shown by Fig. 1. Fig. 3 is a sectional side elevation of the device shown arranged as a shovel. Fig. 4 is a perspective view of the parts of the device shown detached.

The numeral 5 designates a dust pan body which is of the usual shape or has the front side fully open and the remaining sides closed with the bottom 6 extended at the front and bent downwardly to form a contacting and bracing lip 7 which strengthens the body 5 and also facilitates the gathering of dust or dirt into the pan body. The body 5 may be constructed of sheet metal and pressed into shape by any suitable means, or may be of cast material as may be desired. If found practicable, materials other than metal may be used in the construction of the pan body.

Extending from and fixed to the rear side 8 of the pan body at the center are two screw-threaded stems or posts 9 provided with suitable thumb nuts 10, one on each.

The handle 11 consists of an elongated flat bar of metal or other suitable material having a crook 12 at one extremity and an angular rest 13 at the opposite extremity, the crook being used by the operator for holding the dust pan or shovel, as the case may be, and the rest 13 bearing on the surface on which the dust pan is disposed. A slot 14 is formed in the rest 13 and a portion of the handle adjacent thereto, and in applying the handle to the rear side or back 8 of the body the screw-threaded stems or posts 9 are caused to project through the slot and the handle is secured in either one of two fixed positions by the thumb nuts 10. Between the straight portion of the handle 11 and the rest 13 a curved bend 15 is formed which facilitates shifting of the handle from a vertical to a horizontal position for a purpose which will be more fully hereinafter explained. The rest 13 is at such an angle relatively to the straight portion of the handle 11 that it coöperates with the lip 7 at the front open extremity of the body of the pan to hold the pan bottom at an elevation above the surface on which it is disposed, as clearly shown by Fig. 2. The handle may be made in various shapes in cross-section, though it is preferred that the lower extremity including the rest 13 be flattened so as to perform its intended function, and the said handle is sufficiently long to permit an operator to use the pan without stooping.

The device as shown by Figs. 1 and 2 is adapted to remove dust or dirt from a floor or other surface, and during this particular use the operator may secure the pan firmly in one position by applying the foot to the rest without grasping the upper portion of the handle and while a broom is being used with both hands to gather the dust or dirt into the pan body, and the material of which the handle is formed will have sufficient resiliency to permit the operator by an upward and downward movement of the foot on the rest or by modifying the pressure on the latter to push or pull the pan backwardly or forwardly to facilitate gathering of dust or dirt under the lip 7 at the front open extremity of the pan body. The angular disposition of the rest 13 also materially assists in changing the application of the handle to convert the device from a dust pan into a shovel.

To change the dust or floor pan as shown by Figs. 1 and 2 into an ordinary pan or shovel for use in dusting tables, desks, window sills, and for removing ashes from grates and other analogous purposes, one of the thumb nuts 10 is detached from its stem or post 9 and the other thumb nut loosened, and by this means the handle may be readily shifted without completely detaching the same from the body of the pan to assume the position shown by Fig. 3. After the handle is arranged as shown by Fig. 3, the nuts 10 are both again tightened and the rest 13 braces firmly throughout its length against the rear side of the body 5 with obvious advantages in the use of the device as a shovel, and the normal angular disposition of the rest 13 relatively to the straight portion of the handle 11 disposes the latter at a slight upward angle when arranged as shown by Fig. 3 with convenience in the use of the same. The bend 15 between the rest and the straight portion of the handle materially aids in turning the extremity of said handle embodying the rest from one position to the other, and the slot 14 is made long enough to accommodate the two adjustments.

From the foregoing it will be seen that the device embodies at least two articles in one organization, or it may be said that there are two dust pans, one operative by grasping the handle and the other by the foot, and a shovel in the same organization.

The device as a whole is simple in its construction and the cost of manufacture will be reduced to a minimum.

What is claimed is:

1. A dust pan body having a forward downwardly projected lip, and a handle applied to the back of the body and adjustable from an upright to a substantially horizontal position to convert the device from a dust pan into a shovel, the handle being provided with a rearwardly projecting angular rest continuing from the part thereof attached to the said dust pan body.

2. A device of the class specified having a body, and a handle applied to the back of the body and adjustable from an upright to a substantially horizontal position and provided with a rearwardly projecting angular rest to engage the surface on which the device is disposed and to serve as a means to hold the body in applied position and move said body without grasping the handle, the angular rest being brought to bear against the back of the body when the handle is adjusted to a substantially horizontal position.

3. A device of the class specified having a body with screw devices projecting from the back thereof, a handle having an angular rest and a slot in the rest and the adjacent straight portion of the handle, the slotted portion of the handle being applied over the screw devices, and securing means detachably engaging the screw devices.

In testimony whereof I have hereunto set my hand in presence of two subscribing witnesses.

ALBERT S. EPPERSON.

Witnesses:
W. D. PADEN,
J. C. REESE.